No. 710,780. Patented Oct. 7, 1902.
E. V. HUTCHENS.
BUCKET OR PARCEL CARRIER.
(Application filed May 16, 1902.)
(No Model.)
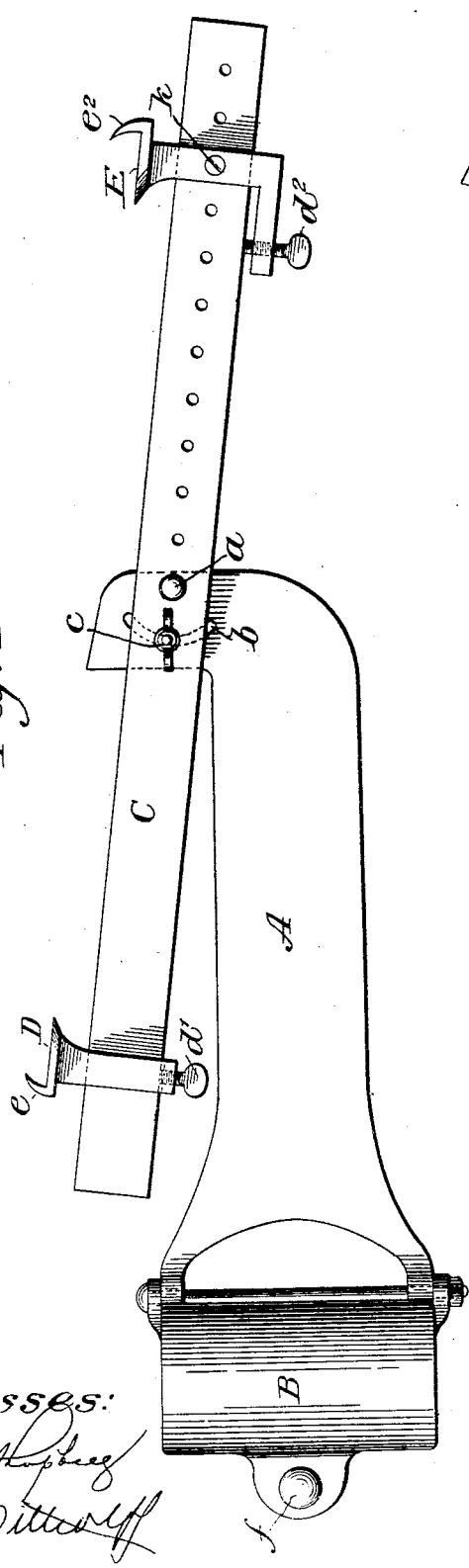
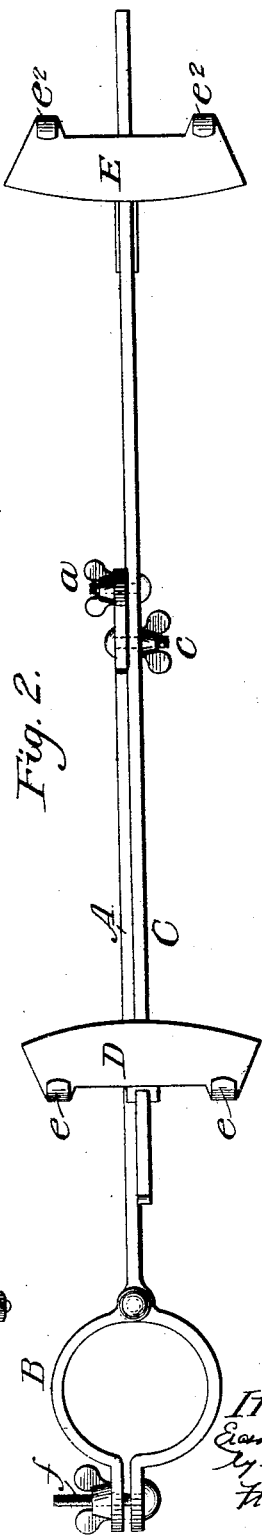

United States Patent Office.

ERASMUS V. HUTCHENS, OF EVANSVILLE, INDIANA.

BUCKET OR PARCEL CARRIER.

SPECIFICATION forming part of Letters Patent No. 710,780, dated October 7, 1902.

Application filed May 16, 1902. Serial No. 107,702. (No model.)

*To all whom it may concern:*

Be it known that I, ERASMUS V. HUTCHENS, a citizen of the United States, residing at Evansville, county of Vanderburg, and State of Indiana, have invented certain new and useful Improvements in Bucket or Parcel Carriers, of which the following is a specification.

My invention relates to a bucket or parcel carrier which may be attached to a desirable place on a bicycle, the object being to provide a secure support which is easily attached and which will combine safety and simplicity with economy. I attain these objects by the use of the device illustrated in the accompanying drawings, in which—

Figure 1 is a side view of my invention, and Fig. 2 is a plan shown as when looking directly at its top.

A represents the principal arm, the rear end of which has a clamp B of suitable size, constructed in the form of a hinge open at its rear end and operated by means of a set-screw $f$, which clamp is designed to embrace that portion of the bicycle to which it is attached, and its object is to hold my device in position when attached and in use. This clamp is joined to shaft A by means of a hinge-like connection or any other desirable method. The shaft A is constructed of any suitable material of any length or size desired, the outer end of which is inclined upward somewhat similar to a sled-runner and being connected to the beam C by means of a bolt or screw $a$.

$b$ represents a semicircular perforation, the purpose of which being to admit of the insertion of a set-screw $c$ through both of the parts A and C in order that the part C may be adjusted to and retained in any desirable position.

Upon the rear end of C is the base or rest D for the object which may be placed upon my device. This is a metal plate of suitable length crossing beam C at right angles, having at each end, on the rear part, an upwardly-projecting brace or clamp $e$. At a point equally distant from each of D's ends and extending downward is attached a metal bar or rod somewhat longer than the width of beam C, which metal bar or rod is perforated by a slot somewhat longer and broader than the respective width and thickness of beam C in order that the beam C may be inserted therein and then clamped by a small set-screw $d'$ at its bottom, which is operated through a threaded aperture extending upward through the bottom end of said portion. This portion of D is thus formed into a collar which encircles the beam C and is moved back and forth to any portion on beam C by proper operation of said set-screw. Upon the forward end of C is another base or rest E, which may be constructed as is D or which may be perforated at point $k$, with a pin or set-screw piercing E and C at any desirable place upon C, which may be perforated as desired. In E, as shown in drawings, $e^2$ represents the brace or clamp, $d^2$ being a set-screw at its bottom which is operated through a threaded aperture extending upward through the bottom end of said portion at the part shown. By tightening the set-screw, $e^2$ is forced slightly forward, thus holding the parcel tighter in place upon the metal plates. If desired, D may be constructed similar to E.

Having fully described my invention, what I claim as new, and desire to secure by Letters Patent, is—

In a parcel-carrier the combination of an arm A, a clamp B hinged to the rear end of said arm and adapted to adjustably secure the arm to the vehicle, a beam C having a longitudinal line of perforations and pivoted on the upwardly-inclined front end of the arm A, rests on said arm, a set-screw for adjustably securing one of said rests on the bottom C, a pin adapted to fit in said perforations and adjustably securing the other of said rests to the bottom, and a set-screw for adjustably turning said last-named rests on said pin as set forth.

In testimony whereof I hereunto affix my signature in the presence of two witnesses.

ERASMUS V. HUTCHENS.

Witnesses:
E. G. RITCHIE,
JOHN N. WAINMAN.